Sept. 12, 1967 P. DEMAN 3,341,845

SYSTEM FOR AUTOMATIC RADIO TRANSFER OF DIGITAL INFORMATION AND FOR DISTANCE COMPUTATION

Filed Nov. 16, 1965 5 Sheets-Sheet 1

Inventor:
Pierre Deman
by [illegible]
his attorneys

Inventor:
Pierre Deman
by Michael S. Striker
his attorney

Inventor
Pierre Deman
by Michael S. Striker
his attorney

Sept. 12, 1967 P. DEMAN 3,341,845
SYSTEM FOR AUTOMATIC RADIO TRANSFER OF DIGITAL INFORMATION AND FOR DISTANCE COMPUTATION
Filed Nov. 16, 1965 5 Sheets-Sheet 4

Inventor
Pierre Deman
By Michael S. Striker
his attorney

Sept. 12, 1967 P. DEMAN 3,341,845

SYSTEM FOR AUTOMATIC RADIO TRANSFER OF DIGITAL INFORMATION AND FOR DISTANCE COMPUTATION

Filed Nov. 16, 1965 5 Sheets-Sheet 5

Inventor
Pierre Deman
By Michael S. Striker
his attorney

United States Patent Office 3,341,845

Patented Sept. 12, 1967

3,341,845

SYSTEM FOR AUTOMATIC RADIO TRANSFER OF DIGITAL INFORMATION AND FOR DISTANCE COMPUTATION

Pierre Deman, Paris, France, assignor to Compagnie Francaise Thomson Houston-Hotchkiss Brandt, Paris, France, a corporation of France Filed Nov. 16, 1965, Ser. No. 508,007
17 Claims. (Cl. 343—6.5)

This invention relates to automatic radio communication systems of the type wherein a first station transmits interrogation signals to a second station remote therefrom, and this latter is automatically triggered to retransmit a response signal that is digitally coded to convey information to the first station.

While susceptible of numerous applications, the invention was especially developed in connection with a world-wide meterological project contemplated for the near future. In that project, provision is made for the combined use of one or more artificial satellites orbiting the Earth, and a multiplicity of weather balloons periodically released from a large number of points distributed around the globe. The balloons carry radiosonde equipment for performing atmospheric temperature and pressure measurements. Automatic radio communication equipment is to be provided aboard the satellite and the balloons whereby the balloons will transmit the temperature and pressure data collected thereby to the satellite in response to interrogating signals therefrom. The satellite, on orbiting past one or more terrestrial stations, will beam thereto all of the data collected by it from the weather balloons during a preceding cycle, together with the positions of the balloons from which each set of data was collected. The positions of the balloons may be determined from range information, as described further below, in combination with bearing data which may be obtained by conventional radio directional means. The system will thus provide a permanent source of information as to the ever-changing atmospheric conditions over the Earth.

The communications aspect of a project of this character raises a number of difficult problems, and important objects of this invention are directed to solving these. While the prior art has many teachings in regard to automatic radio beacons and transponder equipment as used, inter alia, in secondary radar installations for civilian air traffic control needs and IFF systems for military purposes, as well as for communication with artificial satellites, the problems here involved are largely of a different nature.

For one thing, it will be apparent that the system inherently requires omnidirectional transmitting and receiving means. Consequently, the interrogation signals must incorporate address codes capable of selectively triggering the transmitting means of the secondary stations (i.e. balloons), and correspondingly, the response signals from the secondary stations must include similar address codes in order that the main station (i.e. satellite) will be made aware of the particular secondary station whence a given response has come. In view of the considerable number of weather balloons to be provided (about 500), with the balloons situated at widely differening distance ranges from the satellite, this creates a requirement for relatively complex address storage and processing equipment. An object of this invention is to meet this requirement in a simple and effective manner.

The temperature and pressure measurements transmitted from the weather balloons must contain an even greater number of information digits 230 bits being an illustrative figure. This information must be transmitted in the response signal in sequential relation with the address number. An object of the invention is to accomplish this simply and reliably.

Important objects are to ensure that the radio receiving means of the secondary stations will be effectively triggered to commence transmission of a response signal on receipt of an interrogation signal containing its own characteristic addess number, but will be unresponsive to signals transmitted from other secondary stations within communication range, as well as to any stray and spurious signals.

In a system of the type specified, the demands in respect to the various functions enumerated are especially stringent because of the relatively small useful load the weather balloons are able to carry. Moreover, the high rate of expendability of the balloons raises an important economic factor, requiring that the cost of the electronic equipment be held to a minimum. These factors not only require that components be reduced to minimum number and size, but also a minimization of the consumed power. Similiar requirements are not usually present in the case of conventional transponder beacons and the like as provided aboard aircraft. Objects of this invention, therefore, include the provision of circuits that will perform the necessary functions with high dependability and precision as well as economy.

An important object is the provision of improved means for indicating the distance from one to another radio station using a digital counting technique of high accuracy, yet involving a minimum amount of equipment above what is required for the transfer of information between the stations. A further object is to provide means for reliably and simply synchronizing the reception, processing, and retransmission of digitally coded signals with prescribed keying rates. Other objects will appear.

Exemplary embodiments of the invention will now be desscribed with references to the accompany drawings, wherein.

Figure 1:
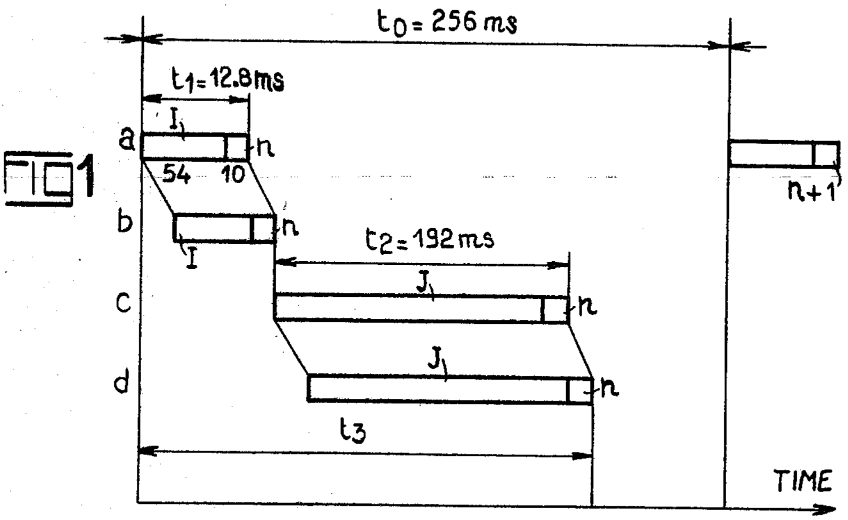
FIG. 1 is a time chart explaining the manner in which interrogation and response signals are transferred between a main station and a plurality of secondary stations.

Reference is first made to FIG. 1 for an explanation of the general method by which information is exchanged between a main station and a secondary station in a system according to the invention. Line *a* of the chart indicates a signal transmitted from the main station, e.g. an artificial satellite in orbit around the Earth. The signal includes two sections, a so-called synchronizing or information section designated I and an address section designated *n*. While the address section follows the synchronizing section as here shown, a reverse arrangement is likewise contemplated according to the invention, as later disclosed in detail.

The address section "*n*" of the message from the main station is a digitally coded number which serves to identify the particular secondary station for which said message is intended. The secondary stations may be radiosonde balloons, several hundreds in number, released from weather stations distributed all over the globe and which are being monitored by the satellite. The secondary stations have respective identification numbers assigned to them, and the main station aboard the satellite is programmed cyclically to broadcast interrogation signals which are intended to be utilized by each of the secondary stations (aboard the balloons) in sequence. Accordingly, line *a* of the chart shows a first interrogation signal intended for balloon Nr. "*n*," and in which the address word is, accordingly, "*n*"; and a following interrogation signal intended for balloon Nr. "$(n+1)$," wherein the address word is "$(n+1)$."

Line *b* of the chart shows the first interrogation signal as received by the radio-receiving equipment aboard balloon Nr. *n*. The horizontal time displacement between the interrogation signals as shown in line *b* and line *a* indicates the propagation time corresponding to the distance between the main station and the particular *n*th secondary station at the instant of transmission.

Line *c* of the chart illustrates a response signal transmitted from the secondary station on reception of the first interrogation signal intended for it. As shown, the response signal is triggered to commence immediately following the reception of the complete interrogation signal containing the proper address numbers (in this case *n*), and it includes an information part J and an identifying part *n*. This latter contains the same number *n* as the related interrogation signal, that is, the identifying number of the secondary station considered, and it will serve to indicate the main station the particular secondary station whence the response signal originated, i.e. it will now serve as "addresser" rather than an "address" indication.

Line *d* of the chart indicates the same response signal as received on the main station, after a time displacement which again corresponds to the propagation distance between the two stations under consideration.

All the signals are coded in a binary digital code, of a particular type to be presently specified in detail. First, a set of suitable numerical values will be indicated by way of example as regards the structure of the signals used.

The interrogation signal words broadcast by the main station each have a total length of 64 bits, including 54 in the synchronizing part I and ten in the address part *n*, the first of these ten bits being a "start" bit. It will be noted that this allows in theory for the identification of $2^9=512$ secondary stations (weather balloons) at a time. Each bit has a basic time width of 200 microseconds; in other words the basic keying rate of the signals is 5000 c.p.s. Thus, the total time duration of an interrogation signal, designated *t*1 in FIG. 1, is seen to be 200 $\mu$s.$\times$64=12.8 milliseconds.

The cycle period, designated *t*0, between consecutive interrogation signals broadcast from the main station and intended for different secondary stations, is 256 milliseconds.

Provision is made for a total number of 512 secondary stations. Hence the full interrogation cycle is seen to comprise 256 $\mu$s.$\times$512=131.072 sec., or about 2 minutes 11 seconds.

The response signal words broadcast from any secondary station each having a total length of 240 bits, 230 for the information part J and of course ten for the addresser part *n*. Each response bit has a basic time width of 800 microseconds. In other words the keying rate used in the response signals is 1250 c.p.s., four times lower than the keying rate used for the interrogation signals. The reason for this will appear later. The duration of a response signal, therefore, is seen to be 800 $\mu$s.$\times$240=192 milliseconds.

The coding system used in accordance with the invention may be described as a split-phase pulse-code modulation system. This is a transitional code, in that transitions between levels, rather than levels, are of significance. A 0 digit in such a code is represented by a pair of transitions at the start and end of every basic keying period, while a 1 digit is represented by one additional transition midway of the basic keying period. It is recalled that the basic keying period is 200 $\mu$s. for the interrogation signals, and is 800 $\mu$s. for the response signals. Hence, in an interrogation signal, a zero is represented by a 200 $\mu$s. spacing between adjacent transitions, and a one is represented by two consecutive 100 $\mu$s. spacing between two adjacent pairs of transitions. In a response signal, the corresponding spacings are 800 $\mu$s. and 400 $\mu$s.

Figure 2:
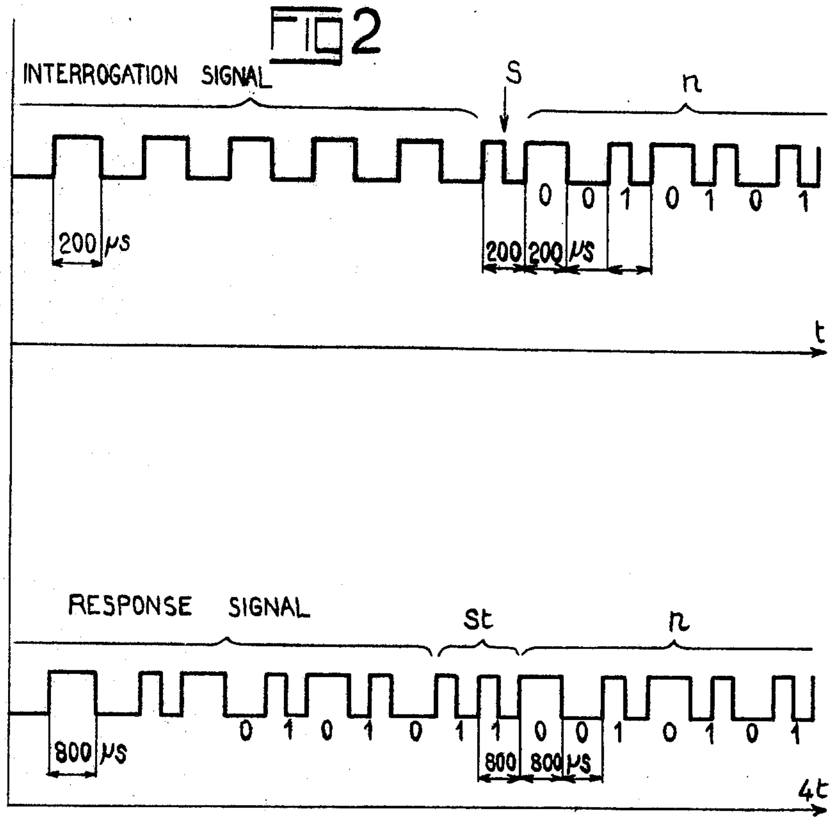
FIG. 2 shows the code structure of the signals used.

Turning to FIG. 2 with the above in mind, the upper line represents a fragment of an interrogation signal including an end section of the synchronizing or information word I therein and an initial section of the address word n, coded in the split-phase PCM scheme described. For reasons that will later appear, the synchronizing word part I is shown as comprising only zero. This is followed by a 1 marker or Start pulse (S) followed by a combination of 0's and 1's comprising the binary number *n* which identifies the address of the secondary station for which the message is intended. In this chart the horizontal coordinate is time, and the vertical coordinate may be amplitude or frequency of the carrier wave.

The second line of the chart represents a fragment of a response signal word, it being noted that the time coordinate is shown on a scale four times smaller than the one used in the upper part of the chart. The information word J is here shown as comprising a binary number including 0's and 1's, which may represent, for example, a set of atmospheric temperature and pressure measurements performed by the radiosonde equipment of the secondary station. In this case, the information word J is separated from the addresser word *n* by a Start group St which is shown as the group 11, this combination being excluded from the coding of the information word J to preclude any confusion with the start group. The addresser word *n* is, of course, identical with the address word *n* in the interrogation signal. The ordinates may be the same as in the interrogation signal.

Figure 3:
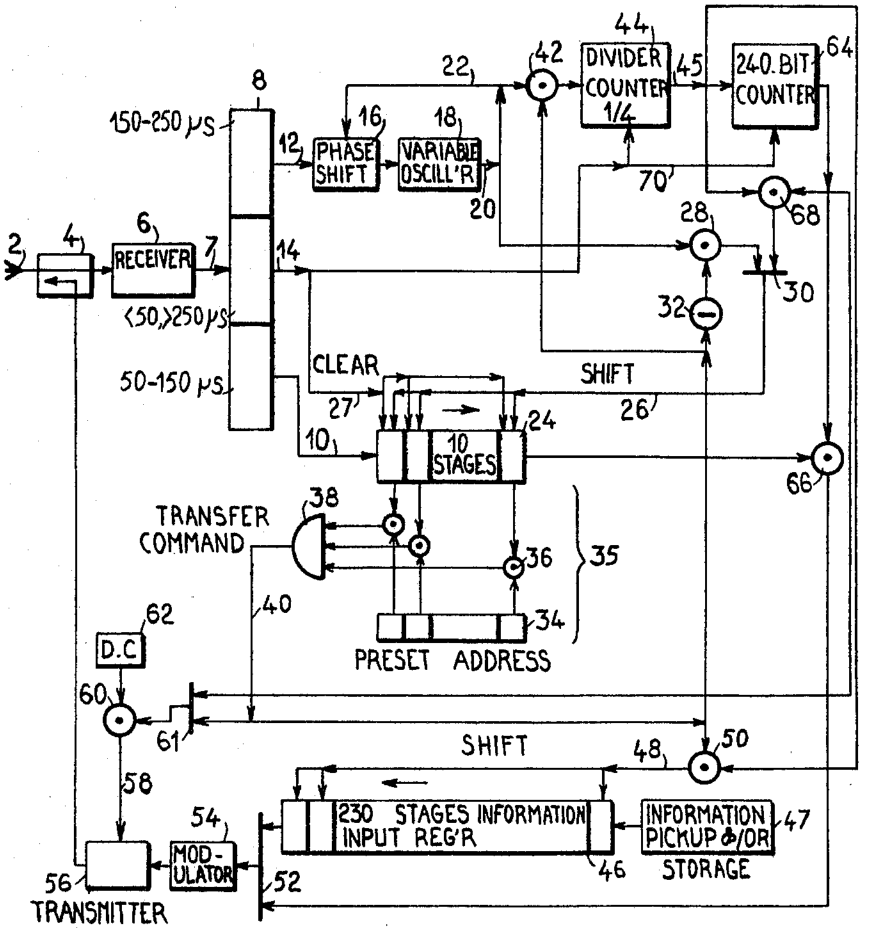
FIG. 3 is a functional diagram of secondary station equipment in one embodiment of a system according to the invention.

Reference will now be made to FIG. 3 for a description of the automatic equipment provided on a secondary station, such as a weather balloon, according to the invention.

An antenna 2 is connected by way of a transmit-receive switch 4 to the input of a suitable frequency-modulation receiver 6 of conventional type. The receiver output is connected to the input of a unit 8 which is here termed a Digital Filter, and may alternatively be described as a "time-interval discriminator." The digital filter 8 has been disclosed in French Patent 1,375,766 filed on behalf of the assignees of the present applicant, and a somewhat modified form thereof will be described herein later with reference to FIG. 6. At this point only a "black-box" description of the functioning of unit 8 is given.

The digital filter unit 8 has a single input 7 from receiver 6 and has three outputs 10, 12, 14. The unit 8 is constructed to sense the time intervals between adjacent transitions applied to its input 7, and to deliver an output voltage on one of its three outputs according to the time interval sensed. Specifically, an output appears on line 10 whenever a time interval between input transitions is sensed within the range 50–150 $\mu$s.; an output appears on line 12 when a time interval between input transitions is sensed within the range 150–250 $\mu$s.; and an output appears on line 14 when the sensed time interval between input transitions is outside both above ranges, i.e. is either less than 50 $\mu$s. or more than 250 $\mu$s.

Considering the description so far, it will be seen that if an interrogation signal of the general type shown in FIG. 2*a* is received by the system and applied to the input 7 of digital filter 8, then every 0 or 1 digit in the signal will cause the digital filter to deliver an output on "synchronizing" line 12, since the time lapse between the transitions characterizing a zero digit is 200 $\mu$s. as earlier explained; and every 1 digit in the received signal will additionally result in an output on information line 10, since such 1 digit is characterized by a 100 $\mu$s. time interval between transitions as described above.

The digital filter output line 12 is connected by way of a variable phase shifter or phase discriminator 16 to the input of a variable-frequency oscillator 18. The output 20 of oscillator 18 is connected by a negative feedback loop 22 to the phase-varying input of phase-shifter or -discriminator 16. This circuit 16–18–20–22 is seen to constitute a conventional phase-lock circuit which constrains the oscillator 18 to deliver an output that is accurately synchronized with the input, both in frequency and phase. Hence, on occurrence of a sequence of 200 μs. pulses on the digital filter output line 12, the oscillator 18 produces a continuous output of 200 μs. pulses which retain their accurate prescribed frequency and phase characteristics in a stable manner over long periods of time. The action of phase-locked oscillator 11, in effect, is to integrate the received 200 μs. pulses over a long series of said pulses and thereby filter the pulses and eliminate or greatly reduce any phase fluctuations that may be present therein due to transmission noise. The precision attainable by this method is about 1 μs. with respect to the nominal phase value, and is attained about 200 microseconds after reception of the synchronizing signal. The 200 μs. pulse train present on oscillator output 20 serves as a train of synchonizing or clock pulses as will appear presently.

The output line 10 of the digital filter is connected to the initial stage input of a digital shift register 24, which herein has a ten-stage capacity to correspond with the ten-bit address section of the interrogation signal. The digital shift register 24 has shift pulses applied in parallel to the ten binary stages thereof over the shift line 26 which connects with the oscillator output 20 by way of an and-gate 28 and an or-gate 30. The and-gate 28, in addition to its input connected with oscillator output 20, has another input from a complementing circuit or not-gate 32, whose function will later appear.

The shift register 24 is associated with a binary register 34 of similar capacity to that of the shift register, and having permanently preset therein the binary number *n* identifying the address of the secondary station under consideration. Corresponding stages of the registers 24 and 34 are connected to respective inputs of an array of and-gates 36, the outputs of which are all connected to the inputs of a common output and-gate 38. The assembly 24–34–36–38 is seen to constitute a conventional digital comparator arrangement. When the binary digits in all of the stages of shift register 24 equal the binary digits initially preset in the respectively corresponding stages of register 34, so that all of the and-gates 36 simultaneously emit ouputs, the output and-gate 38 emits an output voltage on terminal 40. This voltage constitutes a so-called transfer command.

The shift register 24 is seen to have a "Clear" input connection from the upper output 14 of digital filter 8.

The transfer command signal appearing at comparator output 40 is applied, inter alia, to the input of the not-circuit 32 mentioned above.

The operation of the system will be briefly reviewed up to this point of the description. An interrogation signal received by the secondary station is applied to the digital filter or time-interval discriminator unit 8. The initial section I of this signal, fifty-four bits long, is here assumed to comprise all zeros. These zeros are passed by digital filter 8 to output 12 and serve to synchronize the clock oscillator 18 as earlier described, so that the output 20 produces a continuous train of 200 μs. synchronizing or clock pulses. These clock pulses are passed by and-gate 28, since the not-circuit 32 initially applies an output voltage to the other input of this and-gate, and are thence passed by or-gate 30, to the shift input line 26 of shift register 24. The simultaneous application of clock pulses by shift input line 26 to all the stages of the shift register will act to shift any digital information applied to the input stage of this register, through the successive register stages at the rate of one shift per 200 μs., in a well-known manner.

The "Start" 1-digit in the interrogation signal, as well as all subsequent 1-digits therein forming part of the address section *n* of said signal, are passed by digital filter output line 10 to the shift register 24, and are stepped down the stages of the register by the shift pulses as just described. When the complete address number *n* in the interrogation signal has been entered into shift register 24, then should this number equal the preset number in register 34 representing the identification number of the secondary station under consideration, the output and-gate 38 of the comparator arrangement produces a signal at output 40. This signal is applied to not-circuit 32 which thereupon deenergizes the second input of and-gate 28, arresting the application of clock pulses to the shift line 26 of shift register 24. The shifting of information through this register is therefore arrested, and the address number *n* is blocked and thereby memorized in shift register 24 for subsequent use as later described.

Any signals received by the system other than true interrogation signals originating at the main station, would not operate the system in the way just described. There is, for example, a possibility that the antenna 2 of the secondary station might capture response signals broadcast from some other secondary station, such as a weather balloon that may happen to be sailing within communication range. Such response signals, as was stated with reference to FIG. 2, have a keying rate four times lower than the interrogation signals from the main station, i.e. their basic pulsewidth is 800 not 200 μs. Hence, such signals would be passed to the digital filter output line 14, and would act to clear the shift register of previous information stored therein, thereby preventing possible errors. The same effect would be produced by any other spurious signals having a modulation rate outside the predetermined keying range of the interrogation signals. It is seen therefore that digital filter 8, in addition to its synchronizing function and its information-input function, serves as an input sieve to filter out spurious input signals.

The appearance of a transfer command signal at the address comparator output terminal 40, evidencing the receipt of an interrogation signal intended for the secondary station considered, was seen above to arrest the application of shift pulses to shift register 24 thereby temporarily suspending the acceptation of further interrogation signals. The transfer command simultaneously switches the secondary station apparatus from its receiving condition to a transmitting condition, in which it will broadcast response signals at a keying rate four times lower than that of the received interrogation signals.

For this purpose, as shown, the output 20 of clock generator 18 is connected to one input of an and-gate 42 having another input connected to comparator output terminal 40. The output of and-gate 42 is connected to the input of a two-stage binary counter 44 serving as a frequency-divider by the factor four. Thus, the appearance of a voltage at terminal 40, at the same time as it disables, through not-circuit 32, the and-gate 28 to arrest the application of 200 μs. clock pulses to shift register 24, also enables and-gate 42 to produce at the output 45 of divider-counter 44 a train of enlarged synchronizing pulses 800 μs. long, corresponding to the keying rate of the response signals.

The information to be transmitted from the secondary station, such as a binary word representing atmospheric temperature and pressure measurements from the radiosonde equipment of the balloon, is entered by any suitable means not shown from suitable information pick-up and/or storage instrumentation generally designated 47, into a digital shift register 46, herein 230 stages in capacity. Information register 46 has a shift input line 48 connected to the output of an and-gate 50 having one input connected to transfer command terminal 40 and another input connected to the output 45 of the divider counter 45. Hence the 800 μs. clock pulses appearing at said divider output 45 are passed through and-gate 50 as shift pulses to information register 46, shifting the content of the register at the rate of one register stage per 800 μs. to the output of said register. From the register output the information bits are passed serially by way of an or-gate 52 to a transitional coder or modulator 54 at the input of a transmitter unit 56. The transmitter has a D-C power supply input 58 connected to the output of an and-gate 60. One input of and-gate 60 is connected to a D-C power source 62 and its other input is connected to the transfer command terminal 40 through an or-gate 61. The transmitter output is coupled through the T–R switch 4 to antenna 2. The occurrence of a transfer command voltage at terminal 40, therefore, simultaneously with its other actions described, acts to apply power from source 62 through and-gate 60 to transmitter 56 for broadcasting from antenna 2, and simultaneously applies the serial train of information bits from information register 46 to the coding modulator 54 to modulate the broadcast carrier frequency with the information previously stored in register 46, at the keying rate of 800 $\mu$s.

It will be recalled that the response word transmitted from the secondary station includes, following the 230 bits of the information section J (see FIG. 1), a ten-bit "addresser" section containing the identification number $n$ of the secondary station. Means are accordingly provided for applying said identification number $n$ serially to the coding modulator 54 after the last information bit from information register 46 has been passed to said modulator.

For this purpose the output 45 of divider counter 44 is connected to the input of a distributor counter 64 of a capacity to count up to two hundred and forty. The output of counter 64 is connected to one input of an and-gate 66 having another input connected to the last stage output of address shift register 24, and having its output connected to an input of or-gate 52. The output of distributor counter 64 is further connected to one input of an and-gate 68 having its other input connected to divider counter output terminal 45, and having its output connected to an input of previously mentioned or-gate 30 whose output is connected to the shift input line 26 of address register 24. Lastly, the output of counter 64 is applied to an input of or-gate 61. Both the divider counter 44 and distributor counter 64 have clear or resetting inputs connected by a common line 70 to the digital filter output terminal 14. The circuitry thus described operates as follows.

The 800 $\mu$s. clock pulses which appear at divider output terminal 45, at the same time as they commence to shift the information content out of register 46 into the modulator 54, are applied to distributor counter 64 to be counted therein. Counter 64 terminates its count 240 periods later, that is, somewhat after the last information bit from register 46 is shifted into modulator 54. On terminating its count counter 64 delivers an output signal which is applied to and-gate 60, and-gate 66 and and-gate 68, enabling these gates. The enabling of and-gate 68 applies the 800 $\mu$s. clock pulses from divider output 45 through or-gate 30 to the shift line 26 of address register 24. The contents of this register, which, as will be recalled, is the address number $n$ identifying the secondary station, is thus shifted out of register 24 at the rate of 800 $\mu$s. The enabling of and-gate 60 (through the or-gate 61) energizes the transmitter 56. The enabling of and-gate 66 allows the bits of the $n$ number from register 24 to pass by way of or-gate 52 to the modulator 54, to modulate the transmitted carrier wave on termination of the modulation thereof with the bits from information register 46, and thus complete the transmission of the response signal. The operating cycle of the secondary station apparatus shown is thus completed.

It will be observed that in the operating phase last described, the addresser number "$n$" for transmission in the response signal, was derived from the address register 24 in which said number was memorized from the received interrogation signal. Since the number $n$ is a fixed characteristic of the secondary station under consideration, and is preset in register 34 as earlier described, the addresser number may alternatively, if desired, be derived from said register 34. It is found particularly convenient, however, to derive the addresser number from register 24 as here shown, because such an arrangement reduces the number of shift registers required in the system and provides a worthwhile simplification of the equipment.

In the embodiment of the invention thus described with reference to FIG. 3, the section I of the interrogation signal was assumed to comprise only zeros. As disclosed, this section I serves the fundamental purpose of synchronizing the clock generator 18 with the 200 $\mu$s. keying cycle of the interrogation signals. It is important to note in this respect that the simple clock generators advantageously used in practicing the invention may require a comparatively large number of pulses of the prescribed width (e.g. 200 $\mu$s. herein) in order to become properly synchronized, after which they will continue to deliver precisely synchronized clock pulses over indefinite periods of time. Notwithstanding this requirement for a long series of received 200 $\mu$s. pulses, the synchronization of the clock generator occurs in a safe and reliable manner in the system described, because of the fact that the digital filter output line 12 will supply synchronizing pulses to the clock circuit every time the secondary station receiver receives an interrogation signal from the main station, regardless of whether such signal is actually meant for the secondary station under consideration or is meant for any other of the plurality of secondary stations present in the over-all system. In other words there are made available for the synchronizing of the clock generator 18 of any particular secondary station Nr "$n$," not only the zero digits in the I section of the interrogation signal whose address section contains the number $n$ (see FIG. 1), but the zero digits in the I sections of all those cyclically transmitted interrogation signals whose address sections contain 1, 2, . . . $(n-1)$, $(n+1)$, . . . as well.

Because of this desirable property of the system of the invention, it is found feasible to utilize the section I of each interrogation signal for the ancillary purpose of conveying information from the main station to the secondary stations should this be desired. Such information would take the form of a binary number composed of 0 and 1 digits in the I section of the interrogation word. In such case the start signal S serving to separate the information section I from the address section $n$ of the interrogation word, instead of comprising a single 1 digit as indicated above, would take the form of a group of two or more 1 digits which group would then be excluded from the code used in the information section I, as earlier described with reference to the response word structure. Also, the binary combinations used in the address sections of the interrogation signals would likewise be excluded from the coding of the information section I in order to preclude spurious operation of the comparator network 35 as will be understood from foregoing explanations.

Figure 4:
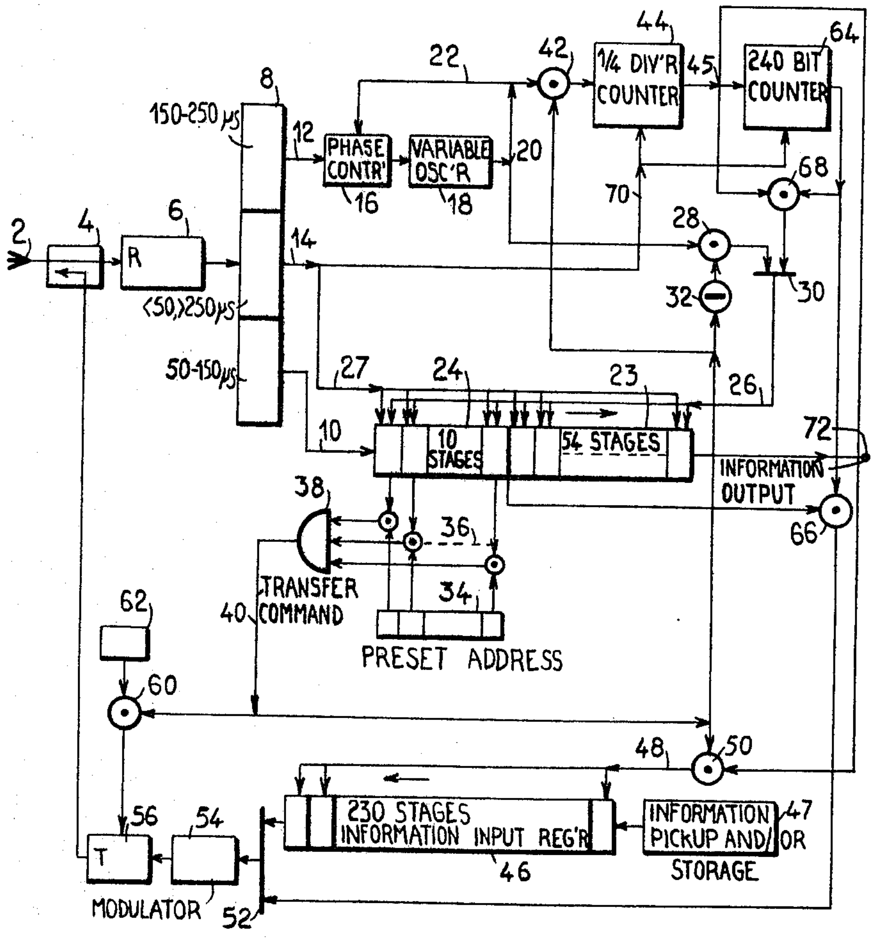
FIG. 4 shows a modification of the secondary station equipment.

The modified embodiment shown in FIG. 4 is suitable for use in cases where the section I of the interrogation words is used to convey information as just described. Components in FIG. 4 that have their counterparts in FIG. 3 are designated with the same references and will not again be described.

Connected beyond the address shift register 24 is an information register section 23, which may form part of the same shift register and comprises fifty four stages continuous with the ten stages of address register section 24. Register section 23 is supplied with the same shift and clear pulses through lines 26 and 27 as register section 24. The output from register section 23 is connected to an information output terminal 72. Thus, the occurrence of a transfer command signal at terminal 40 will act to shift the received information out of register section 23 serially, at the 800 $\mu$s. shift rate, to output 72 for subsequent exploitation in equipment not shown, depending in character on the nature of the information.

Figure 5:
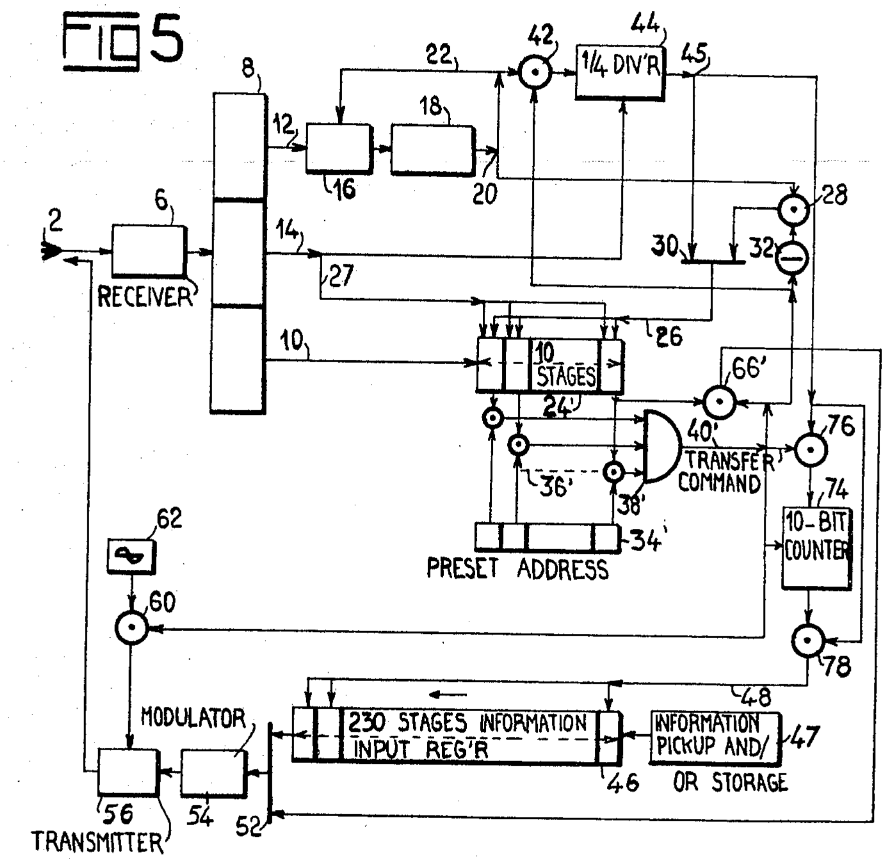
FIG. 5 shows another modification.

FIG. 5 illustrates a modified embodiment of apparatus usable in a secondary station according to the invention in cases where the address portion $n$ precedes, rather than follows, the information portion in the response signal. The interrogation signal, however, is here assumed to be similarly disposed as in the first example, i.e. with I preceding $n$.

The apparatus shown in FIG. 5 is largely similar to that shown in FIG. 3 and corresponding parts are designated with similar references, primed where appropriate. Only the differences will be specifically pointed out. It will be understood that in this embodiment, the transfer command signal appearing at transfer command terminal 40' must act to transfer the content of address register 24' serially to the transmitter modulator 54 immediately, rather than after a delay of two hundred and thirty 800 $\mu$s. clock pulses as in FIGS. 3 and 4. Hence, the 240 bit counter is here omitted, and terminal 40' is directly connected to one input of and-gate 66' whose other input is connected to the last stage output of register 24'. On the other hand, the contents of information input register 46 must in this case be transferred to the modulating unit 54 only after the ten address bits have been transferred. There is accordingly provided a ten-bit counter 74 supplied with 800 $\mu$s. clock pulses from ¼-divider output 45 by way of an and-gate 76 whose other input is connected to transfer command terminal 40'. The output of counter 74 is connected to one input of an and-gate 78 whose other input is connected to ¼-divider output 45 and the output of which and-gate is connected to the shift input line 48 of information input register 46. Thus, after the ten-bit address word $n$ has been completely passed to modulator 54 through or-gate 52, counter 74 delivers a signal which enables and-gate 78 to pass the 800 $\mu$s. clock pulses from divider output 45 to shift the information bits from input register 46 out of said register and through or-gate 52 into the modulator 54 at the 800 $\mu$s. keying rate of the response signal.

Since the present invention utilizes as an important component thereof the digital filter or time-interval discriminator circuit 8, a description of this circuit is included herein for completeness. A more detailed disclosure, in a somewhat modified form, may be found in the assignees' French Patent 1,375,766, filed July 2, 1963 and granted Sept. 14, 1964.

Figure 6:
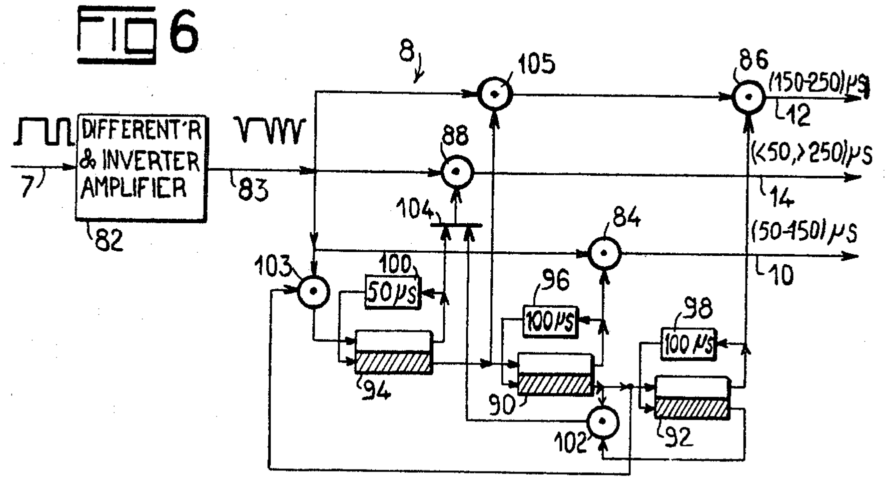
FIG. 6 is a diagram of a digital filter unit used according to the invention.

As shown in FIG. 6, the time discriminator circuit generally designated 8 in FIGS. 3, 4 and 5 includes as its input component a differentiator-inverter amplifier circuit schematically shown as a box 82. This circuit is shown in detail in FIG. 3 of the afore-said French patent. Its function is to convert each positive-going or negative-going transition applied from the receiver output line 7, into a spike pulse of negative polarity, as shown by the pulse-forms at the output 83 of circuit 82.

Output terminal 83 is connected as shown by way of and-gates 84, 105, 86, 88, later described, to the output lines 10, 12, 14 of the digital filter unit 8.

There are provided three bistable units 90, 92, 94, such as conventional Eccles-Jordan circuits or the like. Each bistable unit has a delay line associated with it, respectively 96, 98, 100. The delay line has its input connected to the "set" output and its output connected to the "resetting" input of the associated bistable unit, so as to constitute therewith, in effect, a monostable circuit arrangement as will presently appear. The time delays of the delay lines 96, 98, 100, are 100 $\mu$s., 100 $\mu$s. and 50 $\mu$s. respectively.

The logical circuit connections between the components are apparent from the diagram so that only the operation need be described. It is noted that in each of the bistable units, the setting input and set output are shown connected with the non-hatched half of the unit, while the resetting input and reset output are connected to the hatched half thereof.

Initially, in the absence of received pulses, all three bistable units are reset due to the action of the associated delay devices. Initially therefore, and-gates 105, 103 and 88 all are conditioned for passing pulses from line 83.

Consider an initial transition appearing on receiver output line 7. The transition, regardless whether it be positive- or negative-going, is converted into a negative spike pulse appearing at terminal 83 of differentiator-inverter circuit 82. The initial negative spike pulse is passed through gate 88 (enabled at this time), and issues over output line 14 to reset the various counters and registers of the embodiments of the invention described with reference to FIGS. 3, 4 and 5. Said initial spike pulse further acts by way of and-gate 103 (enabled at this time as noted above) to switch bistable unit 94 to its set state in which the unit delivers a negative voltage on its set output line. This negative voltage is applied 50 $\mu$s. later through delay line 100 to reset the unit 94. During the set period of unit 94 the unit enables, through or-gate 104, the and-gate 88 which therefore is capable of passing subsequent spike pulses to output line 14 only if such subsequent spike pulses occur less than 50 $\mu$s. after the first spike pulse considered.

As bistable unit 94 is reset it sets unit 90 and this unit in turn is reset 100 $\mu$s. later through delay line 96. During the set period of unit 90, the unit enables and-gate 84 which therefore will pass spike pulses to output line 10 only if such pulses occur during a time interval of from 50 $\mu$s. to 150 $\mu$s. following on the first spike pulse.

As unit 90 is reset it sets unit 92, and this unit is reset 100 $\mu$s. later through delay line 98. While set, unit 92 enables and-gate 86, which therefore will pass spike pulses to output line 12 only if they occur during a time interval of from 150 $\mu$s. to 250 $\mu$s. after the first considered pulse.

Spike pulses appearing at terminal 83 later than 250 $\mu$s. after initial pulse are passed to output line 14 through or-gate 104 together with the pulses occurring earlier than 50 $\mu$s. since such belated pulses occur at a time when both bistable unit 90 and 92 are reset and and-gate 102 consequently is producing an output enabling the output gate 88 through or-gate 104.

In the above operation, it will be noted that gate 103 is disabled during these periods when gate 84 is enabled, thus preventing the setting of unit 94 by 1-bit transitions.

Further, gate 105 is disabled after receipt of an initial transition (which sets unit 94 as explained above). This serves to prevent a second pulse, if any, received within the 50 $\mu$s. set period of unit 94, from passing gate 86 at the same time as it passes gate 88.

It will thus be apparent that the digital filter or time-interval discriminator unit 8 operates in the manner earlier specified to sense the time lapse separating consecutive transitions in an incoming transition-coded signal, and pass pulses to line 10, 14, and 12, according as said time lapse is substantially 100 $\mu$s., substantially 200 $\mu$s. and outside the 50–250 $\mu$s. range, respectively.

As earlier indicated, an important aspect of the invention relates to means for distance measurement between two radio stations or beacons, such as an artificial satellite and a weather balloon, which means is capable of high precision in the distance measurement while requiring only a minimum of simple and inexpensive equipment most of which is common with the equipment provided in the stations for the exchange of information between them. Referring again to FIG. 1, it will be evident that the distance (D) from the main station to secondary station Nr. n is given by the equation $$D=\frac{c}{2}(t_3-t_1-t_2)$$

where $c$ is the velocity of electromagnetic waves and $t_1$, $t_2$, $t_3$ are the time intervals indicated on the chart. In the numerical example earlier given, the time interval $t_1=64\times0.2=12.8$ milliseconds, and $t_2=240\times0.8=192$ milliseconds. Hence D=150 ($t_3$−204,800), where $t_3$ is expressed in microseconds and the distance D in meters.

Figure 7:
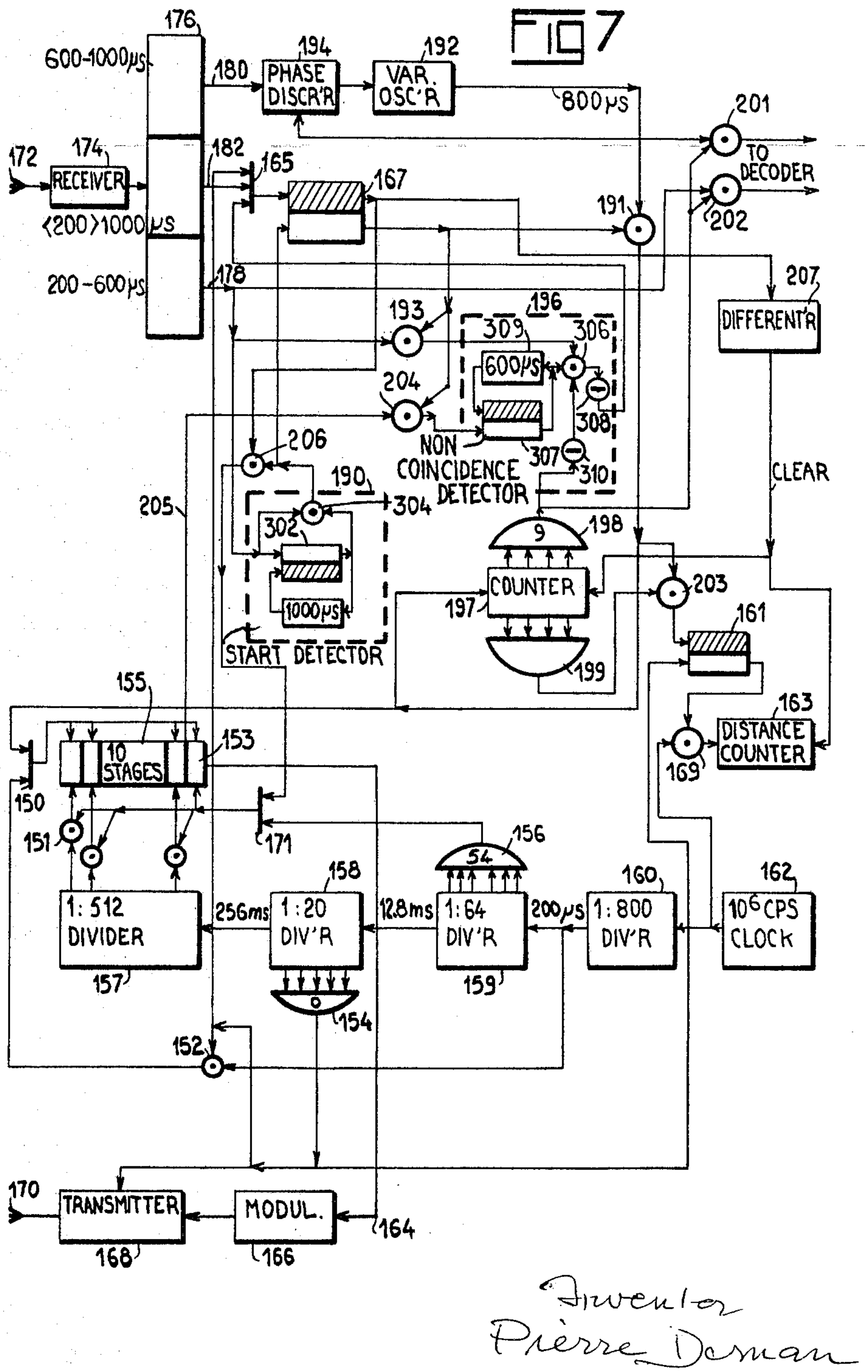
FIG. 7 is a diagram of part of the equipment of a main station in a system according to the invention, including improved distance measuring means.

FIG. 7 illustrates part of the equipment provided in the main station in a system according to the invention and embodying the distance-measuring feature just referred to, as well as the means used for performing the interrogation and address-checking functions.

The apparatus shown includes a program sequencer assembly driven from a clock pulse generator 162 generating clock pulses at the rate of $10^6$ per second. The program sequencer assembly includes a string of digital counters acting as dividers connected in cascade from the output of clock generator 162 to generate various keying rates used in the system. Specifically, a first divider counter 160, having the division factor 1:200, produces the 200 $\mu$s. pulse rate used as the basic keying rate in the interrogation signals (cf. FIG. 1); a second divider counter 159, factor 1:64, produces a 12.8 millisecond pulse rate determining the length ("$t_1$") of an interrogation word; a third divider counter 158, division factor 1:20, produces a 256 millisecond pulse rate which defines the time lapse ("$t_0$") between consecutive interrogation signals; and finally a fourth divider counter 157, division factor 1:512, is operated from counter 158 so as to count out a cycle of 512 consecutive integers which constitute the address numbers of the respective secondary stations. Thus, during any 256 ms. ($t_0$) period that comprises a particular interrogation period of the total interrogation cycle (duration 256 ms.×512=131 seconds approx.), the content of counter 157 represents the address number of the particular secondary station being interrogated during that period.

Counter 157 has its nine stages connected to first inputs of respective and-gates 151 whose outputs are connected to the first nine stages, respectively, of a ten-stage shift register 155. Thus the energization of the second inputs of and-gates 151 in parallel, through means later described, will transfer the nine-bit significant portion of the address number from counter 157 into register 155.

Counter 158 is arranged to produce a signal at the output of a coincidence-gate 154 associated therewith, during the initial 12.8 ms. period of every 256 ms. interrogation period, which initial 12.8 ms. represents the duration of an interrogation word as indicated by $t_1$ in FIG. 1. For this purpose gate 154 has its inputs connected, as schematically indicated, to the suitable outputs of a conventional diode matrix (not shown) associated with counter 158 so that all said inputs are energized during a "zero" condition of the counter 158 at the start of every counting cycle. The signal delivered by gate 154 has several actions, as indicated by the connections shown.

First, the signal from gate 154 is applied to the main station transmitter 168 to energize the transmitter and condition it for transmission over antenna 170.

Secondly and simultaneously, the signal is applied to enable an and-gate 152 which thereupon passes the 200 $\mu$s. keying rate pulses from the output of counter 160, by way of an or-gate 150, as shift pulses to the stages of the address register 153. The contents of this register (initially all zeros before transfer of the address number thereinto from counter 157), are thus passed serially from the register output, over a line 164, for application at the 200 $\mu$s. keying rate to a coding modulator 166, for transmission by the transmitter 168 as an interrogation signal.

Thirdly and simultaneously, the signal from coincidence gate 154 is applied to the setting input of a bistable unit 161. The unit 161 thereupon emits at its set output a signal that enables an and-gate 169 to pass microsecond pulses from the megacycle clock generator 162, to a distance counter 163.

Thus, the distance count is initiated. Counter 163 will proceed to count out microsecond pulses until such time as the bistable unit 161 is reset to disable and-gate 169. This resetting of unit 161 will occur on reception, by the receiver 174 of the main station, of a response signal whose address number matches the address number of the particular interrogation signal that initiated the distance count, as will later be described.

The signal from gate 154 is, lastly simultaneously applied by way of an or-gate 165 to the resetting input of a further bistable unit 167, whose function will appear later.

As earlier noted (FIGS. 1 and 2) the interrogation word includes a synchronizing section I which consists of fifty-four consecutive zeros, followed by the address section *n* which includes an initial 1-bit as a Start marker followed by nine significant address bits. Accordingly, the transfer of the current address number from counter 157 into register 155 by way of the and-gates 151 must occur at the fifty-fourth 200$\mu$s. keying period after initial application of shift pulses to register 155. For this purpose, there is associated with the counter 159 an and-gate 156 having its inputs so connected with the matrix outputs of said counter as to produce an ouput signal every time said counter 159 reaches the fifty-fourth position in its 64-period counting cycle. The output of gate 156 is, accordingly, applied by way of an or-gate 171 to the enabling inputs of all the and-gates 151 to effect the aforementioned address transfer. Said output signal from and-gate 156 is simultaneously applied to the tenth stage of register 155, thereby inserting a 1-bit into said tenth stage to constitute the Start marker in the transmitted interrogation signal.

It will thus be apparent that the shift register 155 is operated by the circuitry described, to apply to modulator 166 for transmission from the main station, an interrogation signal word including fifty-four zeros (the synchronizing section I) followed by the address number "*n*" of the particular secondary station being monitored, this latter number being preceded by a Start marker bit. As the counter 158 passes from its zero position to the 1-position in its counting cycle, after interrogation word has been completely transmitted, gate 154 is deenergized, disabling and-gate 152 and deenergizing the transmitter 168.

Meanwhile response signals are being received at antenna 172 (which may if desired be the same as antenna 170), and passed to receiver 174. The receiver output is connected to a digital filter 176 similar to the one used in each of the secondary stations of the invention and as described in detail with reference to FIG. 6, except that the time intervals between which said filter discriminates are now matched to the response keying rate rather than the interrogation keying rate, and hence are four times longer than the intervals previously specified. This, of course, involves merely a suitable alteration of the time constants of the delay units 96, 98, 100 shown in FIG. 6.

Specifically, filter 176 has an information pulse output line 178 delivering a pulse on sensing an interval between input transitions within the time range 200–600$\mu$s., a synchronization pule output line 180 delivering a pulse when the time interval sensed between input transitions falls within the range 60–1000 $\mu$s., and an error-checking output 182 which produces a pulse whenever the spacing between input transitions falls within neither of the above ranges.

The response keying-rate pulses derived from the synchronization output line 180 are applied to a phase-locked oscillator 192 by way of a phase comparator or discriminator 194, as in the arrangement disclosed in connection with the secondary stations. As earlier described the output of oscillator 192 provides a train of synchronizing keying pulses, herein 800 $\mu$s. in duration, which are accurately synchronized with the nominal keying rate of the response signals owing to the phase-averaging or -integrating action of the phase-locked oscillator.

The 1-digit pulses (400 $\mu$s. in duration) from filter output line 178 are applied to a "start-detector" circuit generally designated 190, which acts to deliver an output signal in response to a pair of consecutive 1-bits applied to its input, such pair of 1-bits constituting (in the example) a Start marker in the response signal, as described with reference to FIG. 2. The start detector 190 may simply comprise a bistable unit 302 and an associated and-gate 304. The input to detector 190 (from filter output 178) is simultaneously applied to the setting input of the bistable unit 302 and to one input of the and-gate 304. The set output from the bistable unit is applied to the other input of the and-gate, and by way of a delay line having a time constant of say 1000 μs., to the resetting input of the bistable unit. The output of the and-gate 304 constitutes the output of the start detector. With this arrangement, it will be apparent that a 1-bit applied to the input of start detector 190 sets the bistable unit, and if another 1-bit follows within a 400 μs. period, the detector 190 produces an output from its and-gate.

The start-detector 190 may be shorted out in cases where the address section precedes rather than follows the information section J in the response signals, since in such cases the start may constitute a single 1-bit.

The output from start-detector 190 is applied to the setting input of the afore-mentioned bistable unit 167, and is also applied by way of the or-gate 171 to the address transfer and-gates 151. On detection of the Start group, an and-gate 206 is closed from the reset output of bistable unit 167. This insures that gate 171 will not be actuated by spurious "start" groups in the code. Thus, on detection of a "11" start marker in the response signal, the start detector 190 acts to transfer the nine significant bits of the address number in the interrogation word from counter 157 into shift register 155, and simultaneously causes shift pulses at the response keying rate of 800 μs. to be applied to the shift register stages, through the or-gate 150, from the output of an and-gate 191 which has one input connected to the output of synchronizing oscillator 192, and its enabling input connected to the set output of bistable element 167, which set output now produces a signal since the bistable unit has been set by the start detector as just indicated.

The interrogation address digits are therefore shifted out of register 155 at the rate of one stage per 800 μs., over line 205 connected to the output of the ninth register stage. From line 205 the interrogation address digits are applied serially to one input of an and-gate 204 whose other input is connected to the set output of bistable element 167, now energized, so that said interrogation address digits are passed by and-gate 204 to one input of a comparator network generally designated 196, in this embodiment a non-coincidence detecting network.

Non-coincidence network 196 has another input connected to an and-gate 193, which has an input connected to the information pulse output line 178 of the digital filter, and an enabling input from the set output of binary element 167. Thus, with element 167 set by start detector 190 as described above, gate 193 passes the 1-digits in the response signal for comparison, in the non-coincidence detector network 196, with the 1-digits of the address section of the interrogation signal applied to the first input of the non-coincidence network.

Non-coincidence detector network 196 includes an and-gate 306 having two inputs respectively connected to the output of an and-gate 193 and to the reset output of a bistable unit 307, and a complement or not-gate 308 connected to the output of the and-gate, and providing the output of the network. The second input of network 196 connected to the output of gate 204 acts to set the bistable unit 307. This unit together with the associated 600 μs. delay line 309 constitutes a monostable circuit. During the 600 μs. set period of unit 307 gate 306 is opened. This checks the coincidence in case of time fluctuations in the pulses being compared. Network 196 thus produces an output pulse in the event of a discrepancy occurring in any one of the nine pairs of bits serially applied to its inputs. The output pulse from non-coincidence detector 196, if any, is applied through or-gate 165 to reset the binary unit 167, thereby disabling gate 191 and so suspending the application of shift pulses to register 155.

The setting of bistable unit 167 on detection of a start group by detector 190, noted above, had the further action of enabling a nand-gate 191 to pass the 800 μs. response keying rate pulses from synchronized oscillator 192 to the input of a digital counter 197, which thereupon commences to count the 800 μs pulses. Counter 197 may have any desired counting capacity, large enough to ensure that a sufficient number of 800 μs. response pulses have been handled by oscillator 192 to provide an accurately phased output from the oscillator, as earlier explained. Counter 197, on reaching the end of its count, produces a signal at the output of a coincidence gate 199 having its inputs suitably connected to the diode matrix of the counter. The signal from the gate 199 is applied to an input of and-gate 203, enabling the gate to pass the next 800 μs. pulse from oscillator 192 to the resetting input of bistable element 161. The resetting of element 161 disables and-gate 169 and arrests the count in distance counter 163.

The counter 197 has another coincidence gate 198 associated with its output matrix, and so connected as to produce an output signal as the counter reaches the ninth position in its counting cycle, after commencement of the count initiated on detection of the start group in the response signal by start detector 190, as noted above. The signal emitted by gate 198 is applied to the non-coincidence detector 196 to terminate the operation thereof; for this purpose the output of gate 198 may be applied by way of a not-gate 310 to a third input of the and-gate forming part of the non-coincidence detector. The latter then produces an output which by way of or-gate 165 resets the bistable unit 167, terminating the application of shift pulses to interrogation address shift register 155, as earlier described. The output signal from gate 198 is also applied to the enabling inputs of respective and-gates 201 and 202, having their outputs connected to decoder circuitry, not shown. The gates 201 and 202, when thus enabled, pass to the decoder, respectively the subsequent synchronization 800 μs. pulses from oscillator 192, and the subsequent information pulses from digital filter output 178. It will be understood that these subsequent synchronizing and information pulses digits that are passed to the decoder (not shown) after counter 199 has counted nine 800 μs. pulses following a start group, represent the information section of the response signal.

In case a spurious signal is detected on the digital filter output line 182 or a non-coincidence is detected by device 196, such signal is applied through or-gate 165 to reset the bistable element 167 for arresting the application of response bits and interrogation address bits (from shift register 155) to comparator 196. Element 167 is likewise reset through a third input of or-gate 165 by a signal from coincidence gate 154, i.e. on initiation of the transmission of an interrogation signal by the main station, as earlier indicated.

Bistable unit 167 is reset either because of detection of an error or on initiation of operations, such resetting being produced through a conventional differentiator circuit 207 sending a set-reset transition. At such times both counters 197 and 163 are cleared by way of a "clear" line as shown. This cancels the distance measurement, as required in case of error and to reenable the system for subsequent operation.

The distance counter 163 is initially preset to a value as derived from the equation for D earlier given herein, and taking into account the fixed delays occurring in the pulse processing apparatus of the main and secondary stations (including the delay corresponding to the counting period of counter 197) which delays are constants of the system, so that the said count will indicate the true distance of the secondary station from the main station. It will be seen that the distance counting apparatus described requires but very little extra equipment above that involved in the processing of the interrogation and response signals in the main station. At the same time, the distance measurement provided is of extreme accuracy. The attainable precision is only slightly less than that corresponding to the duration of the high-frequency pulses from generator 162, i.e. in this case 150 meters (the distance corresponding to 1 microsecond two-way wave transmission time). This is because the instants of starting and closing of the count of microsecond pulses in the distance counter, are determined to within one microsecond each, plus or minus a minute additional error due to the fluctuations in the phasing of the 800 $\mu$s. pulses from synchronized oscillator 192. This additional error, however, is extremely small since as earlier explained the phase fluctuations are averaged out over the total number of bits used for the distance measurement.

Many modifications may be made in the apparatus described and shown without departing from the scope of the invention. While for convenience in illustration the information collected at each of the secondary stations has been disclosed as applied to the modulating and transmitting means by way of a multi stage shift register 46 (FIGS. 3, 4 and 5), it is to be distinctly understood that such a shift register need not be physically present, and that the information, such as temperature and pressure data delivered by the sensers of the radiosonde equipment, may be passed directly and without intermediate storage from said sensers to the coding modulator 54 at the rate determined by the shift pulses present on the line designated 48. The logical circuitry, in particular, may be modified in a variety of ways without exercising further invention. In the claims, expressions such as "first station," and "secondary stations" are to be interpreted broadly wherever the context permits, as simply designating two remote stations between which digital information is to be exchanged. The relative functions of the two types of station may in some cases be inverted: thus, the distance measuring equipment, herein disclosed as being provided in the primary station, may well be provided in the so-called secondary stations.

The invention was developed in connection with a specific meteorological project involving satellites and radiosonde balloons, and the disclosure has been set out primarily in terms of this particular application. However, various other applications are conceivable and are contemplated. One such application is a world wide navigational aid system for surface craft, wherein the main station would be provided in a satellite (as herein) while the secondary stations would be provided aboard ships.

What I claim is:

1. A system for transferring information between a first station and second stations, the first station including radio means for transmitting digitally coded interrogation signals each comprising an address number characterizing a second station, and wherein a second station comprises:
- radio receiver means for receiving said interrogation signals and means for transmitting coded response signals;
- address means including:
  - digital storage means having said characterizing address number stored therein and
  - means connected to accept signals from the receiver means and connected to said storage means and responsive to agreement between an address number in a received interrogation signal and said stored address number for emitting a transfer command; and
- means responsive to said transfer command and connected for operating said transmitting means to transmit a response signal and including
- means connected to said address means for transmitting said stored characterizing address number as part of said response signal.

2. A system for transferring information between a first station and second stations, the first station including radio means for transmitting digitally coded interrogation signals each comprising an address number characterizing a second station, and wherein a second station comprises:
- radio receiver means for receiving said interrogation signals and means for transmitting coded response signals;
- digital shift register means connected to said receiver means for accepting interrogation signals therefrom;
- digital storage means having said characterizing address number stored therein;
- digital comparator means interconnecting said shift register means with said address storage means and responsive to agreement between an address number in a received interrogation signal and said stored address number for emitting a transfer command;
- means responsive to said transfer command and connected for operating said transmitting means to transmit a response signal comprising said characterizing address number;
- clock pulse generator means producing a train of synchronizing pulses at a rate corresponding to the digital keying rate used in the coding of the interrogation signals;
- means applying said synchronizing pulses as shift pulses to said shift register means for accepting interrogation signals from the receiver means; and
- means responsive to the transfer command for cutting off said shift pulses to arrest the acceptation of further interrogation signals.

3. A system as defined in claim 2, wherein said clock pulse generator comprises a phase-lock circuit including a variable frequency oscillator, input control means for said oscillator to control the frequency and phase of the output pulse train delivered thereby, and a negative feedback loop connecting the oscillator output with said input means; and means connecting the receiver means to said oscillator input control means for synchronizing said output pulse train with said keying rate of the interrogation signals.

4. A system for transferring information between a first and second station, wherein a first station includes radio means for transmitting digitally coded interrogation signals having a predetermined keying rate and each comprising an address number characterizing a second station, and wherein a second station comprises:
- radio receiver means for receiving said interrogation signals and means for transmitting coded response signals;
- means connected to accept signals from the receiver means and responsive to the address number in a received interrogation signal for issuing a command on agreement of said address number with the address number of said second station;
- clock pulse generator means connected to said receiver means and synchronizable by means of received interrogation signals to generate a train of clock pulses at a prescribed keying rate; and
- means responsive to said command and connected to said clock pulse generator means for operating said transmitting means to transmit a response signal as a set of code pulses having said prescribed keying rate.

5. A system as claimed in claim 4, wherein said clock pulse generator means comprises a variable-frequency oscillator, input control means for said oscillator to control the frequency and phase of the output pulse train delivered thereby, and a negative feedback loop connecting the oscillator output with said input means; and means connecting the receiver means to said oscillator input control means for synchronizing said output pulse train with said predetermined keying rate of the interrogation signals.

6. A system as claimed in claim 4, wherein said prescribed keying rate of the response signals is different from said predetermined keying rate of the interrogation signals, and including first and second synchronizing means connected to said clock pulse generator means for producing synchronizing pulses at said predetermined and said prescribed keying rates respectively, means for enabling said first synchronizing means during the acceptation of said interrogation signals and means responsive to said command for disabling said first and enabling said second synchronizing means during the transmission of said response signal.

7. In a system for transferring digital information signals between a first and a second station, said information being coded in a split-phase transitional pulse modulation binary code wherein one binary numeration digit is represented by a first time interval between adjacent transitions, said time interval defining a prescribed keying rate of the information signals, and the other binary numeration digit is represented by a second and substantially shorter time interval between adjacent transitions; the provision in at least one of said first and second stations of the combination comprising:

radio receiver means for receiving coded information signals from the other station;

a digital filter unit having an input connected to the receiver means and having a first and a second output, said unit including:

means delivering a pulse at said first output in response to the appearance of consecutive transitions at its input separated by a time interval within a first prescribed range that includes said first time interval; and means delivering a pulse at said second output in response to the appearance of consecutive transitions at its input separated by a time interval within a second prescribed range that includes said second time interval whereby said second output pulses are representative of said other binary digits in the received signals;

digital information processing means connected to said second digital filter output for operation by said pulses representatve of said other binary digits in the received signals;

synchronizable means having an input connected to said first output of the digital filter unit and including means producing an output pulse train synchronized with said first prescribed time interval; and means connecting said output pulse train to said digital information-processing means for synchronizing the operation thereof with the keying rate of said received signals.

8. A system as defined in claim 7, wherein said synchronizable means constitutes a phase-lock circuit comprising a variable frequency oscillator for producing said synchronized output pulse train, input control means for said oscillator to control the frequency and phase of said output pulse train, said input control means being connected to said first output of the digital filter unit, and a negative feedback loop connecting the oscillator output with said input control means.

9. A system as defined in claim 7, wherein said digital filter unit has a third output and means delivering a pulse at said third output in response to the appearance of consecutive transitions at its input separated by a time interval within neither of said prescribed ranges, and means connecting said third digital filter output for arresting the operation of said digital processing means in case of reception of spurious signals.

10. A system as defined in claim 7, wherein said at least one station further comprises:

digital information-delivering means;

radio transmitting means including coding modulator means connected for receiving digital information serially passed thereto from said information delivering means and coding said information in accordance with said split-phase transitional pulse-modulation code, and means for transmitting the coded information;

keying pulse generator means producing a train of keying pulses at a second keying rate different from said prescribed keying rate of the received signals, and so selected that the time intervals between adjacent transitions therein is within neither of said first mentioned prescribed ranges; and means operable for applying said keying pulses from the keying generator means to said information delivering means for serially passing said information to the radio transmitting means, whereby said one station will transmit information signals at a keying rate different from the keying rate of the received signals.

11. A system as defined in claim 10, wherein said digital processing means connected to said second digital filter output includes means responsive to a predetermined code combination of said pulses representative of said other binary digits in the received signals for delivering a transfer command; and means responsive to said transfer command for operating said operable means to apply said keying pulses from the keying generator to said information delivering means for initiating transmission from said one station.

12. A system as defined in claim 11, wherein said digital processing means includes means storing said predetermined code combination as the address of said one station, means for sensing sequential combinations of said pulses representative of said other binary digits in the received signals, and comparison means delivering said transfer command in response to an agreement between a sensed combination of said pulses and said stored code combination.

13. A system as defined in claim 10, wherein said digital information delivering means comprises means producing an address number designating a particular second station, and said digital processing means includes means for sensing sequential combinations of said pulses representative of said other binary digits in the received signals with said address number produced by the information delivering means, and comparison means responsive to agreement between a sensed combination and said address number, for delivering a signal indicating that said one station has received a response from said particular second station.

14. A system as defined in claim 13, including a clock generator producing clock pulses at a high, stable, repetition frequency; a distance counter; means connected to said information delivering means for applying said clock pulses to said distance counter in timed relation with the production of a particular address number to cause the counter to initiate a distance count; and means connected to said comparison means for arresting the application of clock pulses to the counter in timed relation with said signal delivered by the comparison means; whereby said counter will indicate the distance from said one station to said particular second station.

15. A system for transferring information between a first station and second stations, the first station including radio means for transmitting digitally coded interrogation signals each comprising an address number characterizing a second station, and wherein a second station comprises:

radio receiver means for receiving said interrogation signals and means for transmitting coded response signals;

digital shift register means connected to said receiver means for accepting interrogation signals therefrom and connected to said transmitting means for passing said address number thereto;

digital storage means having said characterizing address number stored therein;

digital comparator means interconnecting said shift register means with said address storage means and responsive to agreement between the digital contents of said register means and address storage means for emitting a transfer command;

clock pulse generator means producing a first train of synchronizing pulses at a first rate corresponding to the digital keying rate used in the coding of the interrogation signals and producing a second train of synchronizing pulses at a second rate corresponding to the digital keying rate used in the coding of the response signals, said rates being substantially different;

means applying said first synchronizing pulses as shift pulses to the shift register means for accepting interrogation signals from the receiver means;

means responsive to the transfer command for cutting off said first pulses to arrest the acceptation of further interrogation signals by said shift register means; and further means responsive to the transfer command for applying said second synchronizing pulses to the shift register means to pass said address number to the transmitting means for transmission in said response signal.

16. A system as defined in claim 15, wherein the second station further comprises:

further digital means having an output connected to the transmitting means and adapted for serially delivering thereto a digitally coded number representative of information collected by said second station; and third means responsive to the transfer command for applying said second synchronizing pulses to the further digital means to pass the information number to the transmitting means in sequential relation with said address number whereby to transmit a response signal including two consecutive portions, one portion constituting the address number and the other portion constituting the information number.

17. A system as defined in claim 16, wherein the second station includes a digital counter connected to receive said second synchronizing pulses, and having a counting capacity corresponding to the number of digits in a first one of said response signal portions, and said command-responsive means including means immediately operative on occurrence of the transfer command for passing a first one of said signal portions to the transmitting means, and simultaneously applying said second synchronizing pulses to the counter for initiating a count, and other means operative on termination of said count for applying the second one of said response signal portions to the transmitting means.

References Cited

Altonji, "Airborne Tacan Data-Link Equipment AN/ARN- 26," In Electrical Communication, vol. 34, No. 3, September 1957, pp. 228–242 relied on.

RODNEY D. BENNETT, *Primary Examiner.*

D. C. KAUFMAN, *Assistant Examiner.*